US012179318B2

(12) United States Patent

Banholzer et al.

(10) Patent No.: US 12,179,318 B2

(45) Date of Patent: Dec. 31, 2024

(54) POWERED RATCHET WRENCH

(71) Applicant: MILWAUKEE ELECTRIC TOOL CORPORATION, Brookfield, WI (US)

(72) Inventors: Hans T. Banholzer, Mequon, WI (US); Caleb R. Bahr, Burlington, WI (US); Caleb M. Schober, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 470 days.

(21) Appl. No.: 17/476,819

(22) Filed: Sep. 16, 2021

(65) Prior Publication Data

US 2022/0080561 A1 Mar. 17, 2022

Related U.S. Application Data

(60) Provisional application No. 63/079,093, filed on Sep. 16, 2020.

(51) Int. Cl.

*B25B 21/00* (2006.01)
*B25F 5/00* (2006.01)
*B25F 5/02* (2006.01)

(52) U.S. Cl.

CPC ............ *B25B 21/004* (2013.01); *B25F 5/001* (2013.01); *B25F 5/02* (2013.01)

(58) Field of Classification Search

CPC ....... B25B 21/00; B25B 21/004; B25F 5/001; B25F 5/02

See application file for complete search history.

(56) References Cited

U.S. PATENT DOCUMENTS 9,120,213 B2 * 9/2015 Elger .................... B25B 21/004
10,625,405 B2 4/2020 Silha et al.

(Continued)

FOREIGN PATENT DOCUMENTS

JP 2010099823 A 5/2010
TW M591461 U 3/2020
WO 2009006587 A1 1/2009

OTHER PUBLICATIONS

International Search Report and Written Opinion for Application No. PCT/US2021/050615 dated Jan. 3, 2022 (12 pages).

(Continued)

*Primary Examiner* — David B. Thomas

(74) *Attorney, Agent, or Firm* — Michael Best & Friedrich LLP

(57) ABSTRACT

A power tool includes a main housing having a pair of clamshells, each of which has a mating face and a blind bore within the mating face. The power tool further includes a motor having a front bearing retainer, a plurality of fasteners configured to secure the front bearing retainer within the main housing, and a pin received within the blind bores of the respective clamshells, such that each of the clamshells is inhibited from moving with respect to the other clamshell. The power tool further includes an output assembly having an anvil with an output member configured to engage a socket and a pawl that is moveable between a first position in which the pawl is operatively coupled to drive the anvil in a first direction and a second position in which the pawl is operatively coupled to drive the anvil in a second direction.

19 Claims, 6 Drawing Sheets

(56) References Cited

U.S. PATENT DOCUMENTS

| | | | | |
|---|---|---|---|---|
| 10,953,525 | B2 * | 3/2021 | Hsu | B25B 21/002 |
| 11,412,631 | B2 * | 8/2022 | Genz | H02K 11/30 |
| 11,897,094 | B2 * | 2/2024 | Schultz | B25B 13/465 |
| 2010/0022376 | A1 | 1/2010 | Ackermann et al. | |
| 2012/0186400 | A1 | 7/2012 | Elger | |
| 2020/0215666 | A1 | 7/2020 | Schultz | |
| 2022/0071041 | A1 * | 3/2022 | Genz | H02K 11/00 |

OTHER PUBLICATIONS

Partial Supplementary European Search Report for Application No. 21870196.9 dated Nov. 8, 2024 (20 pages).

* cited by examiner

POWERED RATCHET WRENCH

CROSS-REFERENCE TO RELATED APPLICATIONS

This application claims priority to prior filed U.S. Provisional Patent Application No. 63/079,093, filed on Sep. 16, 2020, the entire contents of which are incorporated by reference herein.

BACKGROUND

The present disclosure relates to a powered ratchet wrench for applying torque to a fastener for tightening or loosening the fastener.

Powered ratchet tools are typically powered by an electrical source, such as a DC battery, a conventional AC source, or by pressurized air. Powered ratchet tools are constructed of components such as a motor, a drive assembly driven by the motor, and an output for applying torque to a fastener.

SUMMARY

In one aspect of the invention, a power tool comprises a main housing including a pair of clamshells, each of which includes a mating face and a blind bore within the mating face. A motor includes a front bearing retainer. The motor is supported within the main housing. A yoke housing is coupled to the main housing and a plurality of fasteners configured to secure the front bearing retainer within the main housing. Each fastener passes through the main housing, the yoke housing, and the front bearing retainer. A pin is received within the blind bores of the respective clamshells, such that each of the clamshells is inhibited from moving with respect to the other clamshell. An output assembly is arranged in the yoke housing and configured to receive torque from the motor. The output assembly includes an anvil having an output member configured to engage a socket, and a pawl that is moveable between a first position in which the pawl is operatively coupled to drive the anvil in a first direction and a second position in which the pawl is operatively coupled to drive the anvil in a second direction opposite the first direction.

In another aspect of the invention, a power tool comprises a main housing, a yoke housing coupled to the main housing, and a motor supported in the main housing and including a stator that is only partially encapsulated by the yoke housing, a rotor rotatable relative to the stator, and a rear bearing retainer that is coupled to the stator. An output assembly is arranged in the yoke housing and configured to receive torque from the motor. The output assembly includes an anvil having an output member configured to engage a socket, and a pawl that is moveable between a first position in which the pawl is operatively coupled to drive the anvil in a first direction and a second position in which the pawl is operatively coupled to drive the anvil in a second direction opposite the first direction.

In yet another aspect of the invention, a power tool comprises a main housing defining a longitudinal axis, a motor supported in the main housing, and an output assembly defining a central axis that is perpendicular to the longitudinal axis. The output assembly is configured to receive torque from the motor. The output assembly includes an anvil having an output member configured to engage a socket, and a pawl that is moveable between a first position in which the pawl is operatively coupled to drive the anvil in a first direction and a second position in which the pawl is operatively coupled to drive the anvil in a second direction opposite the first direction. A printed circuit board that is intersected by the longitudinal axis, arranged perpendicular to the longitudinal axis, and arranged parallel with the central axis.

In yet another aspect of the invention, a power tool comprises a main housing and a motor including a front bearing retainer. The motor is supported within the main housing. An output assembly is configured to receive torque from the motor. The output assembly includes an output member and a drive assembly configured to transfer torque from the motor to the output assembly. The drive assembly includes a ring gear rotationally affixed to the front bearing retainer, such that rotation of the ring gear is inhibited, a sun gear that receives torque from the motor, a plurality of planet gears rotatable within the ring gear in response to rotation of the sun gear, and a planet carrier rotatable in response to rotation of the planet gears.

Figure 1:
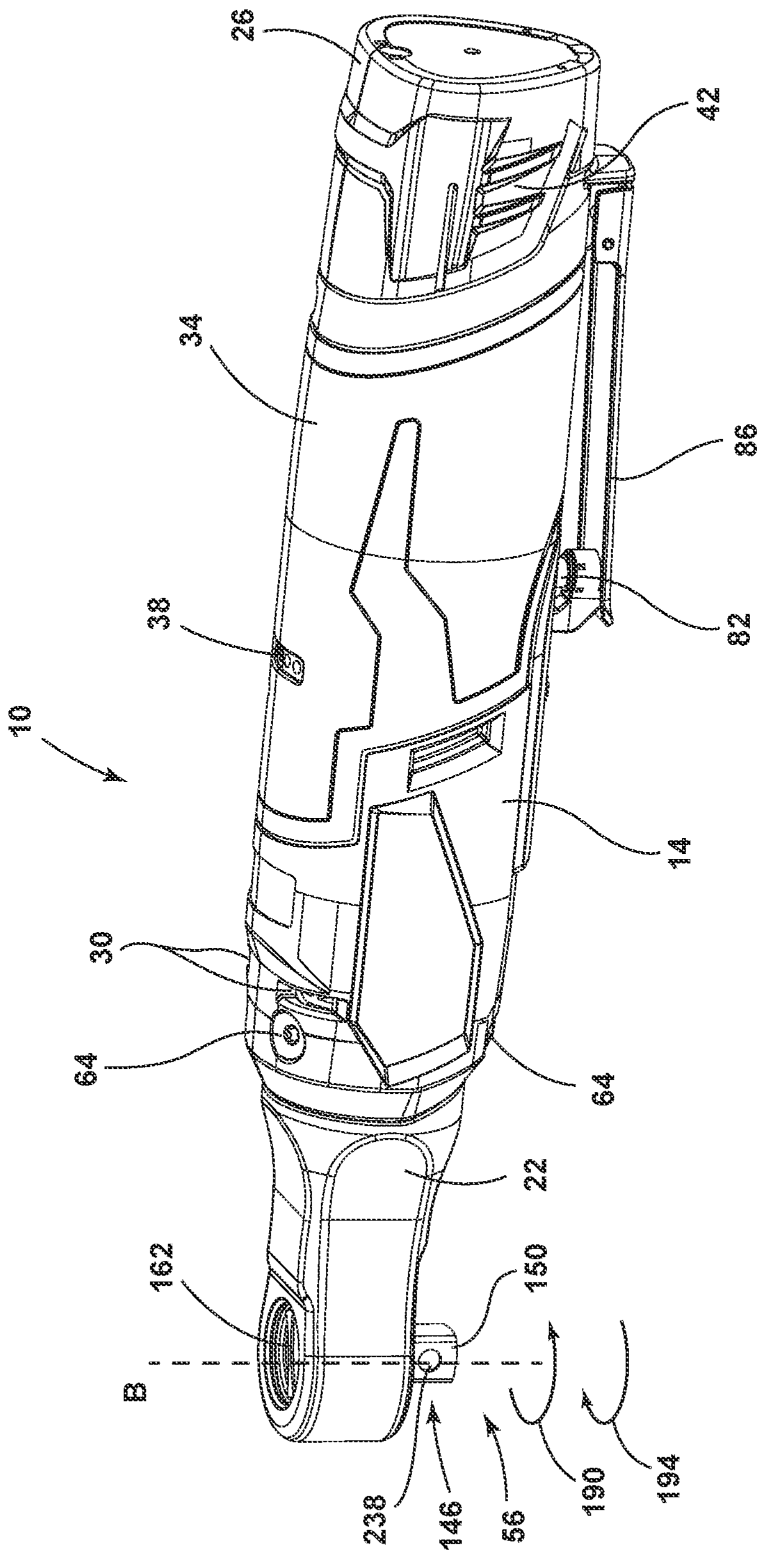
FIG. 1 is a side perspective view of a powered ratchet wrench.

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

DETAILED DESCRIPTION

FIGS. 1-8 illustrate a battery-powered hand-held ratchet tool 10 including a main housing 14, a steel yoke housing 18, a front cover 22 covering a portion of the yoke housing 18, and a battery pack 26 received by the main housing 14. In other constructions, the ratchet tool 10 may be configured as a hand-held ratcheting torque wrench, such as that disclosed in U.S. patent application Ser. No. 15/703,766 filed Sep. 13, 2017, the entire content of which is incorporated herein by reference. The ratchet tool 10 defines a longitudinal axis A.

Figure 2:
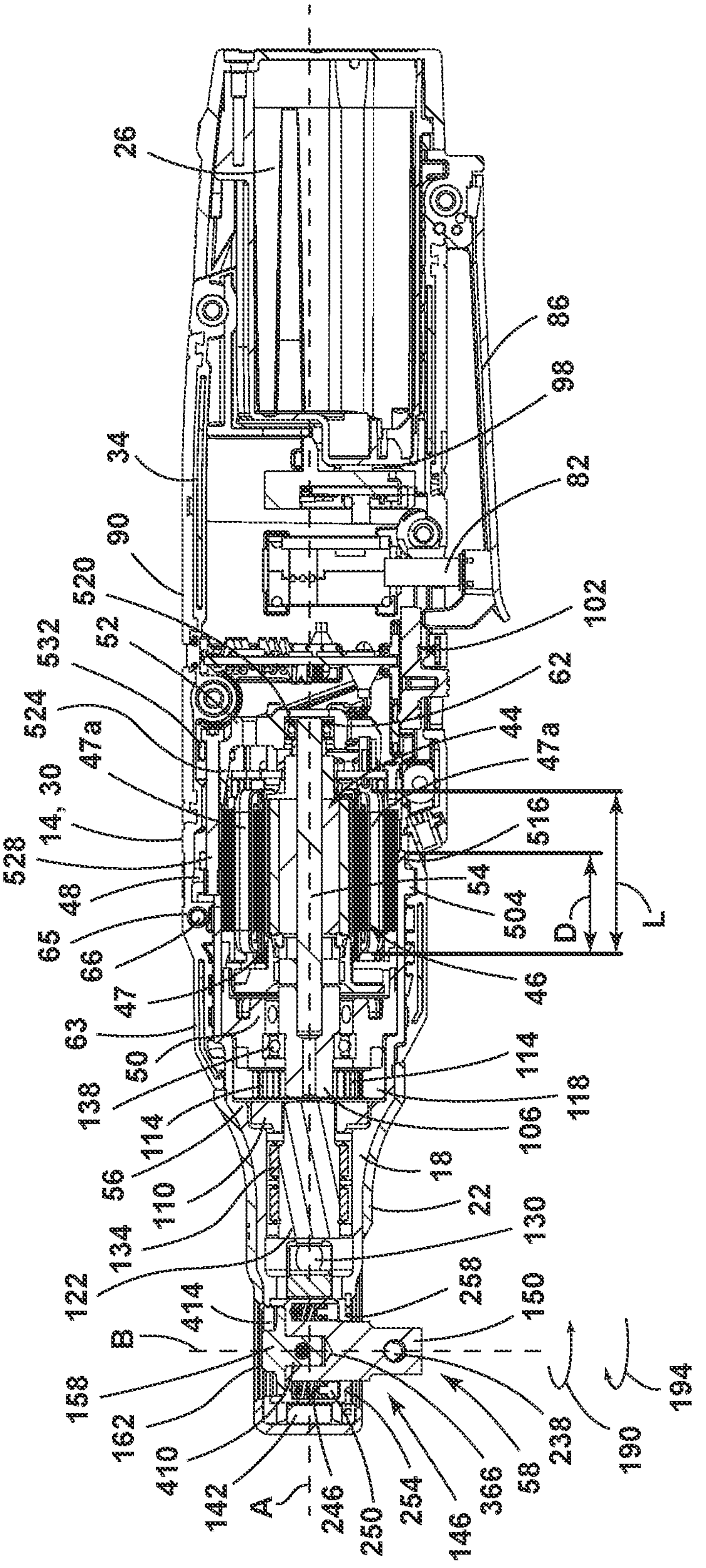
FIG. 2 is cross-sectional view of the powered ratchet wrench of FIG. 1.

With reference to FIGS. 1 and 2, the main housing 14 includes a pair of clamshells 30 and is generally coaxial with the axis A. The main housing 14 also includes a grip 34 that is formed by a resilient material such as rubber or silicone. The battery pack 26 is inserted into a cavity in the main housing 14 in the axial direction of the axis A and snaps into mechanical connection with the main housing 14, thereby also achieving an electrical connection therewith. The main housing 14 includes an indicator 38 that displays a charge level of the battery pack 26. The battery pack 26 includes a latch 42, which can be depressed to release the battery pack 26 from the ratchet tool 10.

The battery pack 26 is a removable and rechargeable 12-volt battery pack and includes three (3) Lithium-ion battery cells. In other constructions, the battery pack may include fewer or more battery cells such that the battery pack is a 14.4-volt battery pack, an 18-volt battery pack, or the like. Additionally or alternatively, the battery cells may have chemistries other than Lithium-ion, such as for example, Nickel Cadmium, Nickel Metal-Hydride, or the like.

Figure 3:
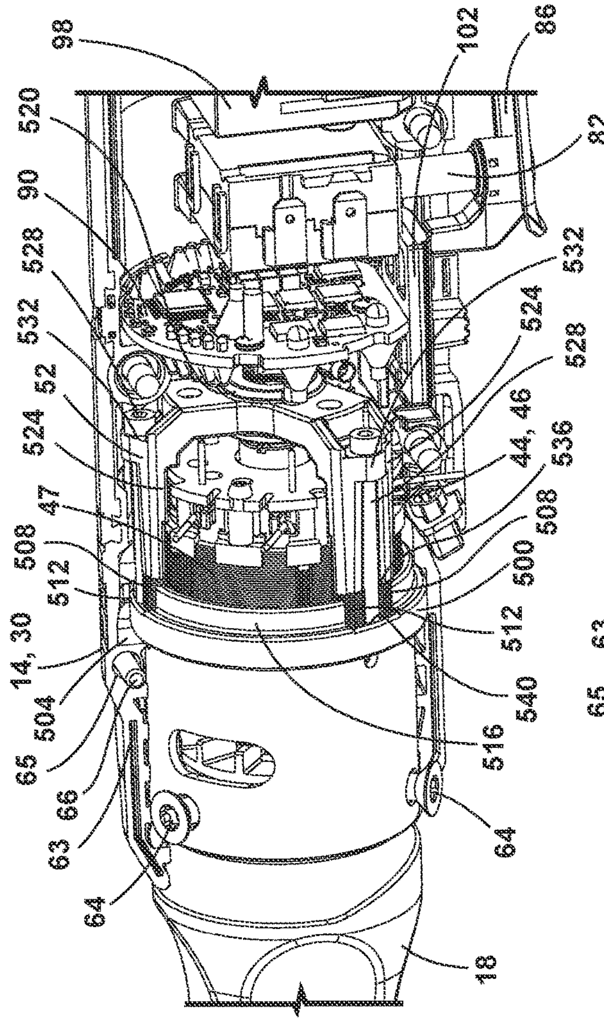
FIG. 3 is an enlarged perspective view of the powered ratchet wrench of FIG. 1, with portions removed.

As shown in FIG. 2, the ratchet tool 10 includes a motor 44 having a stator 46 including a stator core 47 and a plurality of windings 47*a* on the stator core 47, a rotor 48, a front rotor bearing retainer 50 (made from steel), and a rear rotor bearing retainer 52. In the illustrated embodiment, the rear bearing retainer 52 is aluminum, but in other embodiments, the rear bearing retainer 52 could be plastic. As shown in FIG. 3, the yoke housing 18 is coaxially aligned with the axis A via a cylindrical rib 500 that is received within corresponding recesses 504 in the housing clamshells 30. The stator core 47 includes radially outwardly extending stator lugs 508 that are received within corresponding recesses 512 in a rear end 516 of the yoke housing 18. The rear bearing retainer 52 includes a hub 520 (FIG. 2) in which a rear rotor bearing 62 is mounted and multiple arms 524 extending from the hub 520. The arms 524 apply a clamping load to the stator lugs 508 as a result of the arms 524 being fastened to the yoke housing 18. Each arm 524 is respectively fastened to the yoke housing 18 via a fastener 528 (e.g., a cap screw) that extends through a boss 532 in each arm 524, a groove 536 in each stator lug 508, and a bore 540 in the cylindrical rib 500. Thus, the stator core 47 is both rotationally and axially affixed with respect to the yoke housing 18, thereby rotationally and axially affixing the stator 46 with respect to the yoke housing 18

As shown in FIGS. 1-4, a plurality of fasteners 64 secure the front bearing retainer 50 within the main housing 14. Specifically, as shown in FIG. 2, each fastener 64 passes through the main housing 14, the yoke housing 18, and the front bearing retainer 50. By passing the fasteners 64 into the front bearing retainer 50, which is formed of metal, the fasteners 64 are anchored in metal, making them less likely to loosen during operation due to vibration.

As shown in FIG. 2, the rotor 48 includes a motor drive shaft 54 centered about the axis A. A drive assembly 56 is coupled to the motor drive shaft 54 for driving an output assembly 58, as explained in further detail below. The motor drive shaft 54 is rotatably supported in the rear bearing retainer 52 by the bearing 62.

As shown in FIG. 2, the front bearing retainer 50 is encapsulated within the yoke housing 18 and the stator 46 is only partially encapsulated within the yoke housing 18. Specifically, the stator 46 has a length L (coinciding with an axial length of the stator windings 47*a*), and the yoke housing 18 only extends a distance D along the length L of the stator 46. In the illustrated embodiment, a ratio of the distance D to the length L is 0.6, but in other embodiments, the ratio of the distance D to the length L could be less than 0.6. By only partially encapsulating the stator 46 within the yoke housing 18, less material (in this case, steel) is required to create the yoke housing 18 as compared with a design in which the stator 46 is entirely encapsulated by the yoke housing 18.

Figure 4:
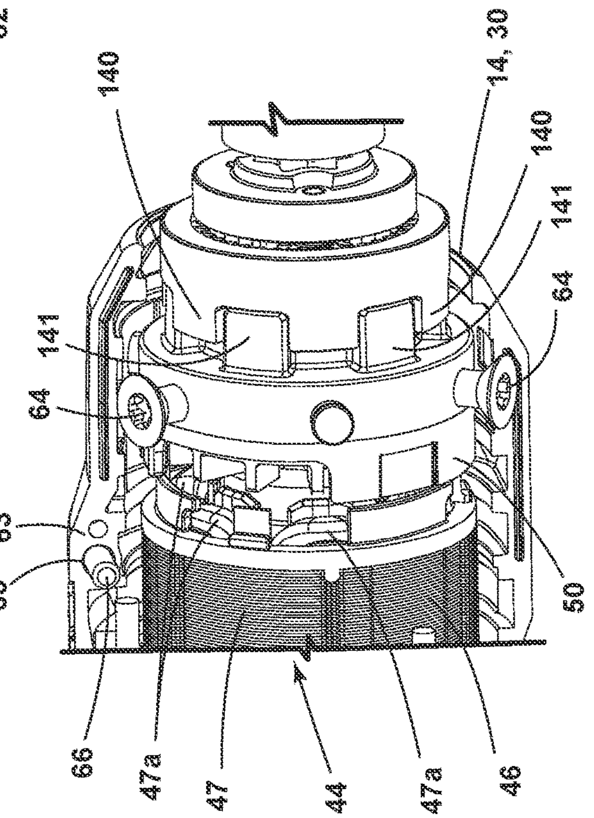
FIG. 4 is an enlarged perspective view of the powered ratchet wrench of FIG. 1, with portions removed.

As shown in FIGS. 2-4, each clamshell 30 includes a mating face 63 and a blind bore 65 within the mating face. A pin 66 is received in the blind bores 65 of each clamshell 30, such that when the clamshells 30 are mated together to help form the main housing 30, the mating faces 63 are engaged and the pin 66 inhibits the clamshells 30 from sliding relative to one another during operation. By using a pin 66 to secure the clamshells 30 with respect to one another, the thickness of the main housing 14 can be reduced, in comparison with an arrangement in which a screw is used to secure the clamshells 30 together. This is because when using a screw, the main housing 14 requires more material to anchor the screw in the clamshells 30.

With reference again to FIG. 2, the output assembly 58 defines a central axis B substantially perpendicular to the axis A, and will be described in greater detail below. The ratchet tool 10 also includes a switch 82 for selectively connecting the motor 44 to the power source (e.g., the battery pack 26), a switch paddle 86 for actuating the switch 82, a power printed circuit board (PCB) 90, a suppressor (not shown), a battery connector 98 for electrically connecting the battery pack 26 to the motor 44, and a lockout shuttle 102 for selectively blocking the switch 82 from actuation, for example, when the ratchet tool 10 is in storage. The power PCB 90 includes power transistors (e.g., MOSFETS) for routing electrical current to the stator to activate the motor 44. The power PCB 90 is intersected by the axis A, arranged perpendicular to the axis A and is arranged parallel with the central axis B, which contributes to reduce the length of the main housing 14. The switch paddle 86 is coupled with the main housing 14 and is depressible to actuate the switch 82 when in a depressed position. The switch paddle 86 is biased to a non-depressed position. The switch 82, when actuated, electrically connects the battery pack 26 and the motor 44 to activate the motor 44.

As shown in FIG. 2, the drive assembly 56 includes a sun gear 106, a planet carrier 110, a plurality of planet gears 114, a ring gear 118, a crankshaft 122 having an eccentric member 126 (FIG. 5), a drive bushing 130, and two needle bearings 134. The sun gear 106 is coupled to the drive shaft 54 of the motor 44 for rotation therewith, and is rotatably supported in the front bearing retainer 50 by a bearing 138. As shown in FIG. 4, the ring gear 118 is rotationally affixed to the front bearing retainer 50 via a key and keyway arrangement. Specifically, the ring gear 118 has a plurality of keys 140 that fit within recesses or keyways 141 of the front bearing retainer 50, thereby rotationally fixing the ring gear 118 and inhibiting rotation of the ring gear 118 with respect to the front bearing retainer 50. As shown in FIG. 2, the ring gear 118 is axially clamped between the yoke housing 18 and the front bearing retainer 50, such that the ring gear 118 is axially fixed therebetween. By fixing the ring gear 118 to the front bearing retainer 50, the ring gear 118 does not need to be press fit into the yoke housing 18.

The planet carrier 110 rotates with the planet gears 114 such that the planet gears 114 rotate about respective axes and follow a circular path. The planet gears 114 are driven by toothed engagement with the sun gear 106, which rotates with the drive shaft 54 by fixed engagement therewith. The crankshaft 122 is driven by fixed engagement with the planet carrier 110, which transfers rotation thereto.

The output assembly 58 is received in the yoke housing 18. The output assembly 58 includes a yoke 142, an anvil 146 having an output member 150 (FIGS. 1, 2, 6 and 8), such as a square head, for engaging sockets, a pawl 154 (FIGS. 5 and 8), and a rotational member 158 having a gripping actuator 162 that is accessible through the cover 22, as shown in FIG. 2. As described in further detail below, the gripping actuator 162 can be used to rotate the rotational member 158 between a first position corresponding to a first rotational direction 190 of the output member 150 and a second position corresponding to a second rotational direction 194 of the output member 150.

Figure 6:
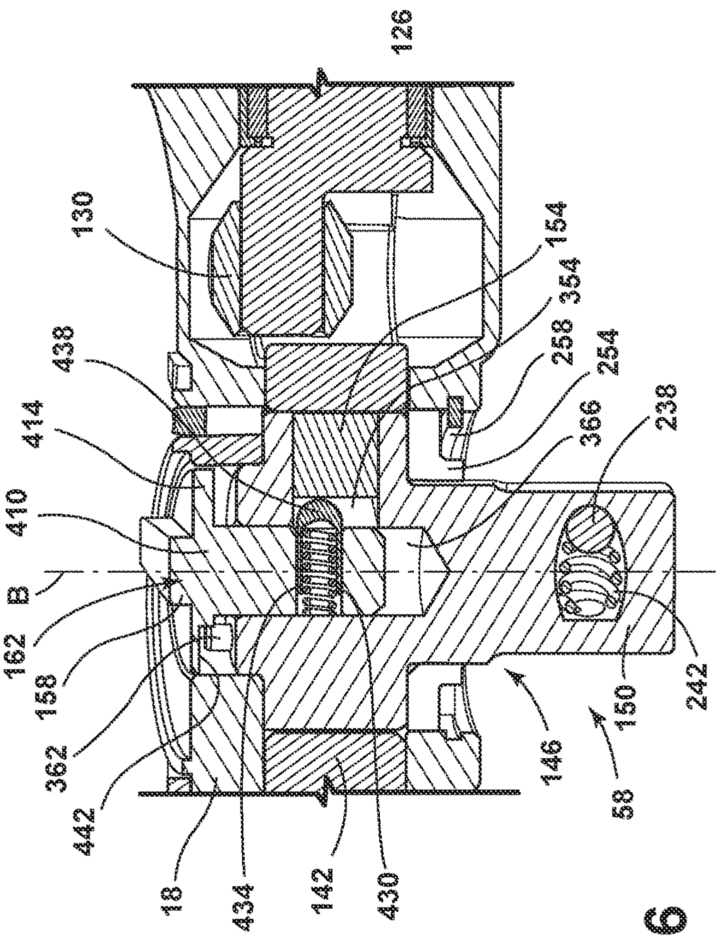
FIG. 6 is an enlarged cross-sectional view of the powered ratchet wrench of FIG.1.
Figure 5:
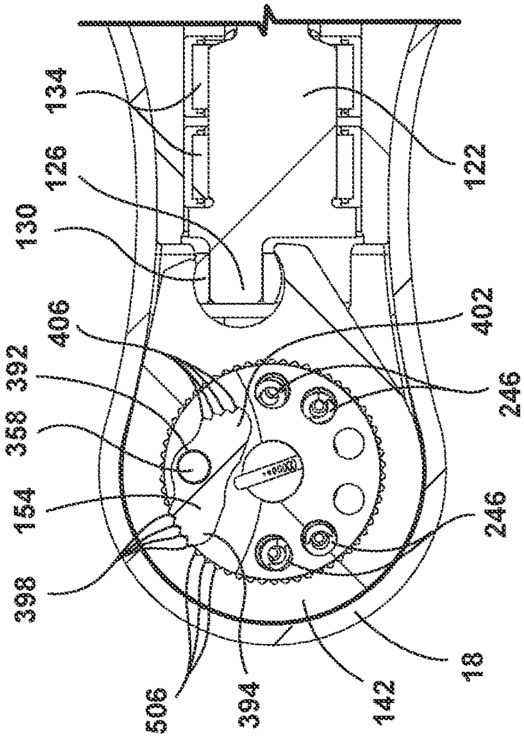
FIG. 5 is an enlarged cross-sectional view of the powered ratchet wrench of FIG. 1.
Figure 7:
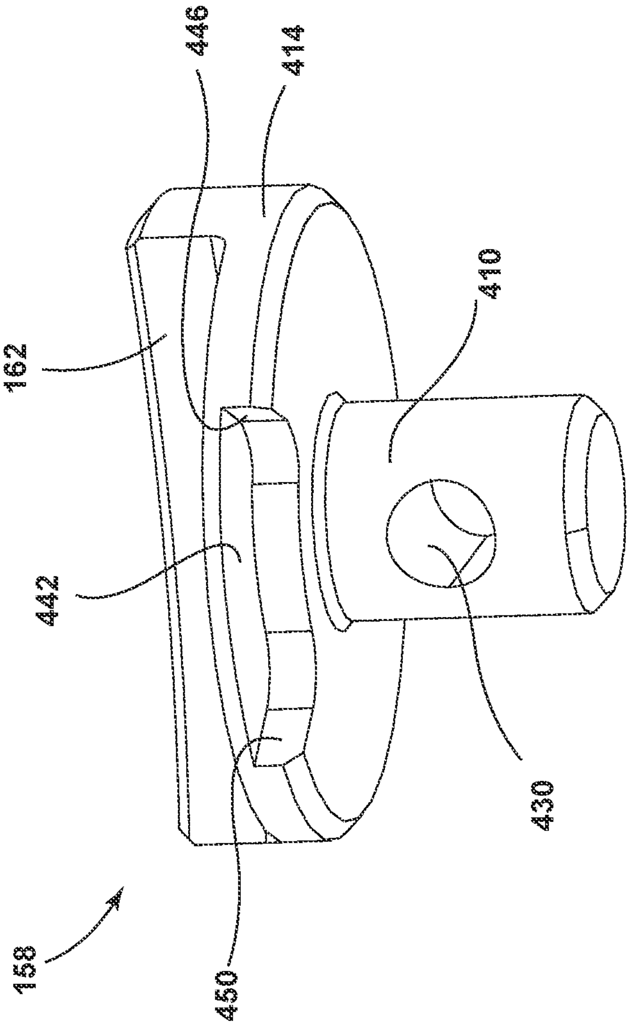
FIG. 7 is a perspective view of a rotational member of the powered ratchet wrench of FIG. 1.

In the illustrated construction, the output member 150 is a ½-inch output member. In other constructions, the output member 150 may be other sizes such as 3/8-inch, or another suitable size. As best shown in FIG. 6, the yoke 142, the anvil 146, and the rotational member 158, are generally centered along the axis B.

Figure 8:
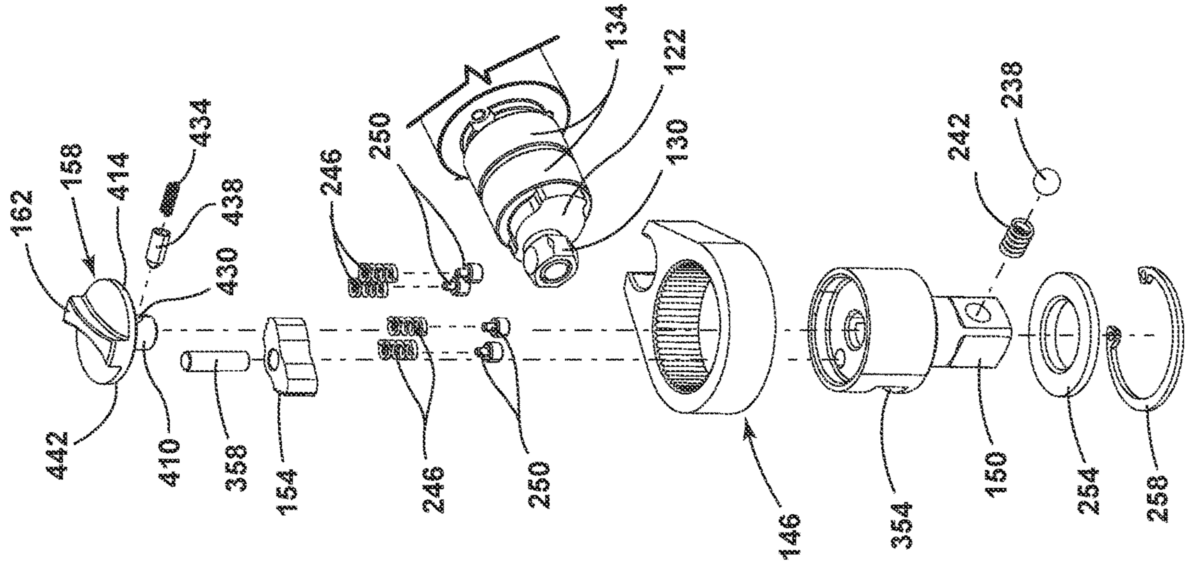
FIG. 8 is an exploded view of an output assembly of the powered ratchet wrench of FIG. 1.

The output assembly 58 also includes a steel ball 238 and spring 242 for retaining sockets on the output member 150, friction springs 246 and corresponding friction members 250 (FIGS. 2 and 8, though only two of the four pairs are shown in FIG. 8), friction plate 254 and retaining ring 258, as will be described in greater detail below. The anvil 146 includes a cavity 354 (FIGS. 6 and 8), a first pin 358 (FIGS. 5 and 8), and a second pin 362 (FIGS. 6 and 8). The anvil 146 also includes a bore 366 that is generally centered about the axis B and that receives the rotational member 158.

With reference to FIGS. 6 and 8, the output assembly 58 includes a single-pawl ratchet design. The pawl 154 is disposed within the cavity 354 and pivotally secured within the cavity 354 by the first pin 358. In the illustrated construction, the first pin 358 extends through an aperture 392 formed at a center of the pawl 154. The pawl 154 includes an angled first end 394 including teeth 398 and an angled second end 402 including teeth 406. The yoke 142 includes inner yoke teeth 506. The pawl 154 is pivotable about the first pin 358 so that the first end 394 or the second end 402 selectively engages the yoke 142 in a driving engagement or a ratcheting engagement, which will be described in greater detail below.

The rotational member 158 includes a shaft 410 (FIGS. 6-8) that extends longitudinally along the axis B. The shaft 410 is received within the bore 366 of the anvil 146. An aperture 430 (FIGS. 6-8) extends through the shaft 410 in a direction substantially perpendicular to the axis B. A spring 434 and a spring cap 438 (which may also be referred to herein as a spring-biased member) are disposed within the aperture 430, which may also be referred to herein as a pocket.

A cavity 442 (FIGS. 6-8) extends upward into an annular member 414 arranged between the shaft 410 and the gripping actuator 162, and includes a first wall 446 (FIG. 7) and a second wall 450 spaced from the first wall 446. The second pin 362 is received in the cavity 442. The rotational member 158 is rotatable with respect to the anvil 146 between a first position in which the second pin 362 abuts the first wall 446 and a second position in which the second pin 362 abuts the second wall 450.

The spring 434 and the spring cap 438, which are rotatable by the shaft 410 between a first position and a second position, selectively urge the teeth 398 of the first end 394 of the pawl 154 or the teeth 406 of the second end 402 of the pawl 154 to engage the yoke teeth 506, respectively. In the first position of the shaft 410, the yoke teeth 506 mesh with the teeth 406 of the second end 402 of the pawl 154 when the yoke 142 moves in a first direction, and the yoke teeth 506 slide with respect to the teeth 406 of the second end 402 of the pawl 154 when the yoke 142 moves in a second direction opposite the first direction.

In the second position of the shaft 410, the yoke teeth 506 mesh with the teeth 398 of the first end 394 of the pawl 154 when the yoke 142 moves in the second direction, and the yoke teeth 506 slide with respect to the teeth 398 of the first end 394 of the pawl 154 when the yoke 142 moves in the first direction. Thus, only one direction of motion is transferred from the yoke 142 to the output member 150. The rotational member 158 is operatively coupled to the spring 434 and the spring cap 438 to orient the pawl 154 with respect to the first pin 358 such that the opposite direction of motion is transferred from the yoke 142 to the output member 150 when the gripping actuator 162 is repositioned.

In operation, the operator actuates the switch paddle 86, which activates the motor 44 to provide torque to the output member 150. The yoke 142 is oscillated about the axis B by the eccentric member 126. The user rotates the rotational member 158 via the gripping actuator 162 to the first potion. As the rotational member 158 rotates, the spring 434 and the spring cap 438 cooperate to urge the pawl 154 to the first position (not shown). In the first position, the output member 150 is configured to be driven in the direction 190.

When the gripping actuator 162 is in the first position, the yoke teeth 506 mesh with the teeth 406 of the second end 402 of the pawl 154 when the yoke 142 moves in a first direction, and the yoke teeth 506 slide with respect to the teeth 406 of the second end 402 of the pawl 154 when the yoke 142 moves in a second direction opposite the first direction. Thus, when the gripping actuator 162 is in the first position, the output member 150 is driven to rotate only in a single direction, e.g., the first direction 190.

To operate the output member 150 in the second direction 194, the operator rotates the rotational member 158 via the gripping actuator 162 to the second position. The spring 434 and the spring cap 438 cooperate to urge the pawl 154 to the second position, in which the teeth 398 of the pawl 154 are in driven engagement with the teeth 506 of the yoke 142.

In the second position, the yoke teeth 506 mesh with the teeth 398 of the first end 394 of the pawl 154 when the yoke 142 moves in the second direction, and the yoke teeth 506 slide with respect to the teeth 398 of the first end 394 of the pawl 154 when the yoke 142 moves in the first direction. Thus, when the gripping actuator 162 is in the second position 186, the output member 150 rotates only in a single direction opposite from when the gripping actuator 162 is in the first position (e.g., the second direction 194).

Various features of the invention are set forth in the following claims.

What is claimed is:

1. A power tool comprising:

- a main housing including a pair of clamshells, each of which includes a mating face and a blind bore within the mating face;
- a motor including a front bearing retainer, the motor being supported within the main housing;
- a yoke housing coupled to the main housing;
- a plurality of fasteners configured to secure the front bearing retainer within the main housing, each fastener passing through the main housing, the yoke housing, and the front bearing retainer;
- a pin received within the blind bores of the respective clamshells, such that each of the clamshells is inhibited from moving with respect to the other clamshell; and
- an output assembly arranged in the yoke housing and configured to receive torque from the motor, the output assembly including
  - an anvil having an output member configured to engage a socket, and
  - a pawl that is moveable between a first position in which the pawl is operatively coupled to drive the anvil in a first direction and a second position in which the pawl is operatively coupled to drive the anvil in a second direction opposite the first direction.

2. The power tool of claim 1, wherein the front bearing retainer is formed of metal.

3. The power tool of claim 1, wherein the front bearing retainer is encapsulated within the yoke housing.

4. The power tool of claim 1, wherein the main housing defines a longitudinal axis, and wherein the pin extends along a direction perpendicular to the longitudinal axis, such that the pin inhibits each of the clamshells from sliding relative to each other in a direction substantially parallel to the longitudinal axis.

5. The power tool of claim 1, wherein the pin is not visible when the pair of clamshells are coupled together and the pin is received within the blind bore of the mating face.

6. A power tool comprising:

a main housing;

a yoke housing coupled to the main housing;

a motor supported in the main housing and including a stator that is only partially encapsulated by the yoke housing, a rotor rotatable relative to the stator, and a rear bearing retainer that is coupled to the stator; and an output assembly arranged in the yoke housing and configured to receive torque from the motor, the output assembly including an anvil having an output member configured to engage a socket, and a pawl that is moveable between a first position in which the pawl is operatively coupled to drive the anvil in a first direction and a second position in which the pawl is operatively coupled to drive the anvil in a second direction opposite the first direction.

7. The power tool of claim 6, wherein the stator has a length and the yoke extends a distance along the stator length, and wherein a ratio of the distance to the stator length is less than or equal to 0.6.

8. The power tool of claim 6, wherein the rear bearing retainer is formed of aluminum.

9. The power tool of claim 6, wherein the rear bearing retainer is formed of plastic.

10. The power tool of claim 6, wherein the yoke housing is formed of steel.

11. The power tool of claim 6, wherein the main housing includes a pair of clamshells, and wherein the yoke housing includes a cylindrical rib that extends radially outward and is received within a recess in the housing clamshells.

12. A power tool comprising:

a main housing defining a longitudinal axis;

a motor supported in the main housing;

an output assembly defining a central axis that is perpendicular to the longitudinal axis, the output assembly configured to receive torque from the motor, the output assembly including an anvil having an output member configured to engage a socket, and a pawl that is moveable between a first position in which the pawl is operatively coupled to drive the anvil in a first direction and a second position in which the pawl is operatively coupled to drive the anvil in a second direction opposite the first direction;

a printed circuit board that is intersected by the longitudinal axis, arranged perpendicular to the longitudinal axis, and arranged parallel with the central axis; and a switch paddle for selectively activating the motor and a lockout shuttle that mechanically interferes with the switch paddle to inhibit the switch paddle from being depressed from a default position to a depressed position, and wherein the printed circuit board is a flat, circular disc with a flat section that is adjacent the lockout shuttle.

13. The power tool of claim 12, wherein the main housing defines a void within the main housing, and wherein the printed circuit board fills the void in its entirety within a cross-section of the main housing that is taken perpendicular to the longitudinal axis.

14. The power tool of claim 12, wherein the main housing defines an inner periphery having an inner radius, and wherein the printed circuit board is coupled to the inner periphery and defines an outer radius that is substantially the same as the inner radius of the inner periphery.

15. A power tool comprising:

a main housing;

a motor including a front bearing retainer, the motor being supported within the main housing;

a yoke housing coupled to the main housing;

a plurality of fasteners configured to secure the front bearing retainer within the main housing, each fastener passing through the main housing, the yoke housing, and the front bearing retainer;

an output assembly configured to receive torque from the motor, the output assembly including an output member; and a drive assembly configured to transfer torque from the motor to the output assembly, the drive assembly including a ring gear rotationally affixed to the front bearing retainer, such that rotation of the ring gear is inhibited, a sun gear that receives torque from the motor, a plurality of planet gears rotatable within the ring gear in response to rotation of the sun gear, and a planet carrier rotatable in response to rotation of the planet gears.

16. The power tool of claim 15, wherein the ring gear includes a plurality of keys that fit within corresponding recesses of the front bearing retainer, thereby inhibiting rotation of the ring gear with respect to the front bearing retainer.

17. The power tool of claim 15, wherein the ring gear is clamped between the yoke housing and the front bearing retainer, such that the ring gear is axially fixed.

18. The power tool of claim 15, wherein the output member is configured to engage a socket, and wherein the output assembly includes an anvil having the output member, and a pawl that is moveable between a first position in which the pawl is operatively coupled to drive the anvil in a first direction and a second position in which the pawl is operatively coupled to drive the anvil in a second direction opposite the first direction.

19. The power tool of claim 15, wherein the output member is a square drive socket.

* * * * *